(12) United States Patent
Sullivan et al.

(10) Patent No.: US 8,042,614 B2
(45) Date of Patent: *Oct. 25, 2011

(54) FIBER LADEN ENERGIZED FLUIDS AND METHODS OF USE THEREOF

(75) Inventors: Philip F. Sullivan, Bellaire, TX (US); Christopher N. Fredd, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/703,225

(22) Filed: Feb. 10, 2010

(65) Prior Publication Data

US 2010/0175874 A1    Jul. 15, 2010

Related U.S. Application Data

(63) Continuation of application No. 10/939,912, filed on Sep. 13, 2004, now Pat. No. 7,665,522.

(51) Int. Cl.
*E21B 43/25* (2006.01)
*E21B 43/26* (2006.01)
*E21B 43/267* (2006.01)

(52) U.S. Cl. ............ 166/300; 166/308.2; 166/308.3; 166/308.6; 166/309; 507/202

(58) Field of Classification Search .................. None
See application file for complete search history.

(56) References Cited

U.S. PATENT DOCUMENTS

| | | | |
|---|---|---|---|
| 3,995,705 A | 12/1976 | Fischer et al. | |
| 4,108,782 A | 8/1978 | Thompson | |
| 4,121,674 A | 10/1978 | Fischer et al. | |
| 5,360,558 A * | 11/1994 | Pakulski et al. | 507/202 |
| 5,392,859 A | 2/1995 | Adams et al. | |
| 5,782,300 A | 7/1998 | James et al. | |
| 6,599,863 B1 | 7/2003 | Palmer et al. | |
| 6,720,290 B2 | 4/2004 | England et al. | |
| 6,729,408 B2 | 5/2004 | Hinkel et al. | |
| 6,776,235 B1 | 8/2004 | England | |
| 6,828,280 B2 | 12/2004 | England et al. | |
| 6,837,309 B2 | 1/2005 | Boney et al. | |
| 7,291,651 B2 | 11/2007 | Chen et al. | |
| 7,350,572 B2 | 4/2008 | Fredd et al. | |
| 7,665,522 B2 * | 2/2010 | Sullivan et al. | 166/300 |
| 2003/0114539 A1 | 6/2003 | Weaver et al. | |
| 2004/0162356 A1 | 8/2004 | Willberg et al. | |
| 2005/0124500 A1 * | 6/2005 | Chen et al. | 507/200 |
| 2006/0032633 A1 | 2/2006 | Nguyen | |
| 2006/0042797 A1 * | 3/2006 | Fredd et al. | 166/282 |
| 2006/0048943 A1 | 3/2006 | Parker et al. | |

FOREIGN PATENT DOCUMENTS

WO    0035998    6/2000
WO    0037777    6/2000

* cited by examiner

*Primary Examiner* — George Suchfield
(74) *Attorney, Agent, or Firm* — Rachel Greene; David Cate; Jeff Griffin

(57) ABSTRACT

The present invention relates to aqueous oilfield treatment fluids containing a gas component and fibers, wherein the fluids may further include a viscosifying agent and/or proppant. The fluids have good proppant suspension and transport properties as well as excellent gas phase stability. Use of fluids comprising an aqueous medium, a gas component, viscosifying agent, and fibers for hydraulically fracturing a subterranean formation, cleanup operations, and gravel packing a wellbore, are also disclosed.

7 Claims, 1 Drawing Sheet

FIBER LADEN ENERGIZED FLUIDS AND METHODS OF USE THEREOF

This application claims priority as a continuation application of U.S. patent application Ser. No. 10/939,912, filed Sep. 13, 2004 now U.S. Pat. No. 7,665,522, which is hereby incorporated by reference in its entirety.

BACKGROUND OF THE INVENTION

This invention relates to fluids used in treating a subterranean formation. In particular, the invention is oilfield treatment fluids containing a gas component and fibers, and uses thereof.

Various types of fluids are used in operations related to the development, completion, and production of natural hydrocarbon reservoirs. The operations include fracturing subterranean formations, modifying the permeability of subterranean formations, or sand control. The oilfield stimulation fluids employed in these operations are known as drilling fluids, completion fluids, work over fluids, packer fluids, fracturing fluids, drilling fluids, conformance or permeability control fluids, and the like.

Fluid technologies incorporating a gas component to form a foam or energized fluid are commonly used as oilfield treatment fluids. For example, some viscoelastic fluids used as fracturing fluids contain a gas such as air, nitrogen or carbon dioxide to provide an energized fluid or foam. Other common uses of foams or energized fluids include wellbore cleanout, gravel packing, acid diversion, fluid loss control, and the like.

Foam or energized fluids are stable mixtures of a gas phase and liquid phase. It is generally believed that a surfactant stabilizes the thin liquid films that form the surface of foam cells, thus reducing coalescence. The foam or energized fluids expand and flow back from the well and force the fluid out of the fracture, consequently ensuring an improved clean-up.

Foam and energized fracturing fluids are generally described by their foam quality, i.e. the ratio of gas volume to the foam volume. If the foam quality is between 52% and 95%, the fluid is conventionally called foam, and below 52%, an energized fluid. In the present patent application, the term "energized fluid" is used however to describe any stable mixture of gas and liquid, notwithstanding the foam quality value.

Hydraulic fracturing is a stimulation treatment routinely performed on oil, gas and other wells to increase fluid production from reservoirs. Specially engineered fluids, including energized fluids viscosified with viscoelastic surfactants or even polysaccharide derivatives (i.e. guar), are often pumped at high pressure and rate into the reservoir interval to be treated, causing a fracture to open. Proppant, such as ceramic beads or grains of sand of a particular size, is slurried with the treatment fluid (usually therefore called a carrier fluid) to keep the fracture open when the treatment is complete. Hydraulic fracturing creates high-conductivity communication with a large area of a formation and bypasses any damage that may exist in the near-wellbore area. It is therefore important for the treatment fluid to have viscosity properties sufficient to suspend and carry the proppant into the fracture zone. In some cases, however, depending upon specific subterranean formation conditions or job designs, energized fluids may not have high enough viscosity to achieve optimum proppant transportation and suspension, thereby resulting in poor proppant placement. Increased levels of viscosifying agent, or surfactants, or higher foam quality may be required to achieve adequate proppant placement, leading to increased resource and material requirements.

Foam or gas phase stability is important when using energized fluids for oilfield treatments. It is generally known that stability is improved by increasing the viscosity of the liquid phase, thus making the gas bubbles more difficult to move together and subsequently coalesce. Adding more viscosifying agent is a common method to help stabilize an energized fluid. Unfortunately, this approach also leads to the need for increased levels of viscosifying agent, and can cause increased polymer damage to the formation.

Therefore, the need exists for energized fluids for oilfield treatment with significant stability, excellent proppant transport and suspension capability, as well as providing improved cleanup properties. A fluid that can achieve the above would be highly desirable, and the need is met at least in part by the following invention.

SUMMARY OF THE INVENTION

The present invention provides aqueous oilfield treatment fluids containing a gas component and fibers. The fluids may further include a viscosifying agent and/or proppant. The fluids have good proppant suspension and transport properties as well as excellent gas phase stability.

The invention also provides for the use of fluids comprising an aqueous medium, a gas component, viscosifying agent, and fibers for hydraulically fracturing a subterranean formation.

The invention further relates to the use of fluids comprising an aqueous medium, a gas component, and fibers for cleanup operations and gravel packing a wellbore.

DETAILED DESCRIPTION OF THE PREFERRED EMBODIMENTS

Figure 1:
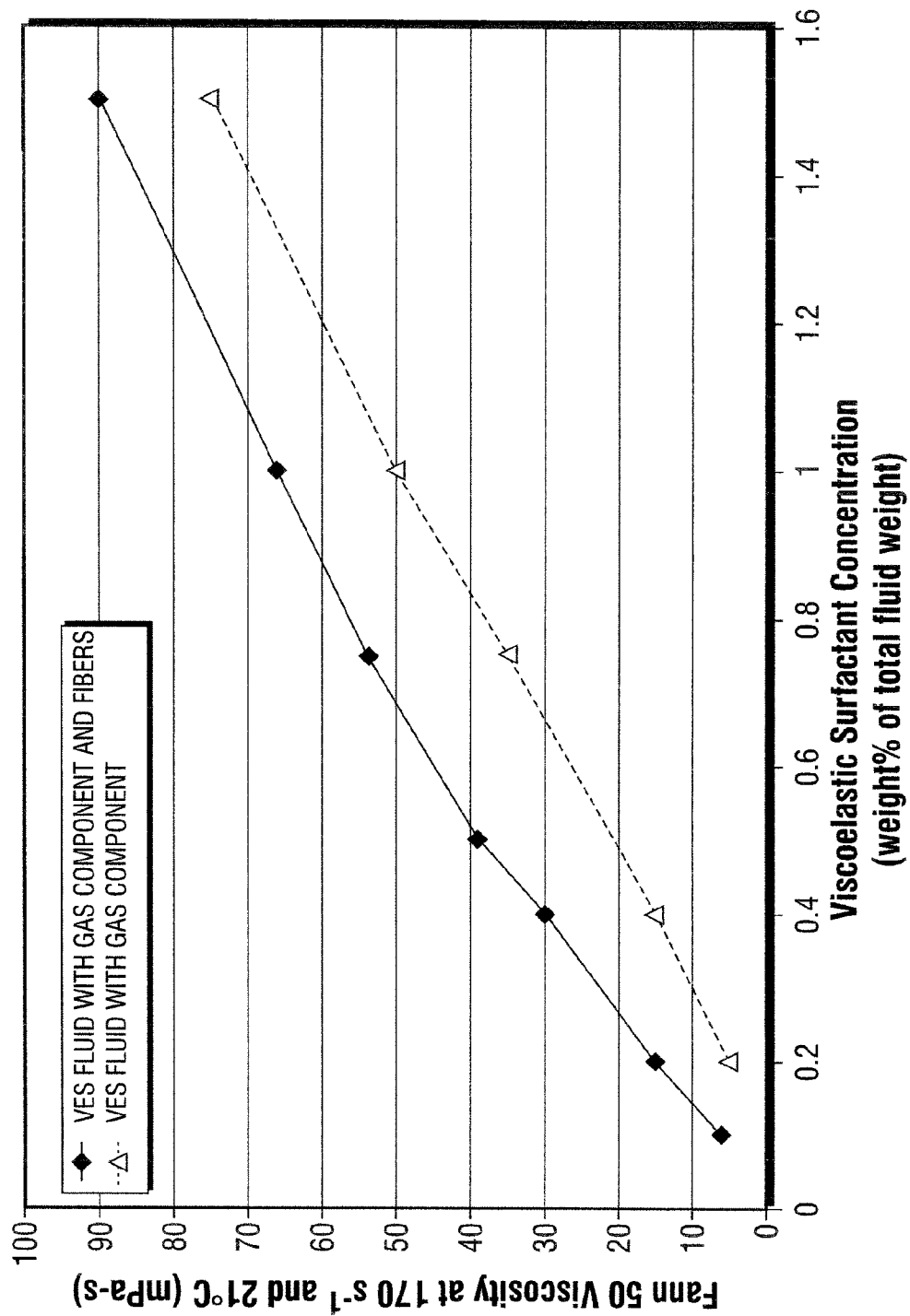
FIG. 1 is a graph illustrating an advantage of adding fibers to fiber laden viscoelastic surfactant (VES) fluids containing a gas component.

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components others than the ones already cited. In the summary of the invention and this detailed description, each numerical value should be read once as modified by the term "about" (unless already expressly so modified), and then read again as not so modified unless otherwise indicated in context.

The invention provides fluids useful for treating a subterranean formation. In particular, the invention provides energized aqueous fluids containing a gas component and fibers useful for the suspension of particles, which has excellent gas phase stability and cleanup properties. As used herein, the terms "energized fluid" and "fluid" are used to describe any stable mixture of gas phase and liquid phase, notwithstanding the foam quality value, i.e. the ratio of gas volume to the total volume of gas phase and liquid phase. The term "fibers," as used herein, is meant to describe fibers, platelets, or mixtures of fibers and platelets.

Fluid compositions of the present invention are useful in oilfield operations as stimulation fluids, including methods of fracturing subterranean formations, modifying the permeability of subterranean formations, fracture or wellbore cleanup, acid fracturing, matrix acidizing, gravel packing or sand control, and the like. Other applications comprise the placement of a chemical plug to isolate zones or complement an isolating operation.

It has been unexpectedly discovered that the addition of fibers to an aqueous energized fluid gives fluids with exceptional particle suspension and particle transport capabilities, and excellent gas phase stability. When the energized fluid is an oilfield treatment fluid, further containing viscosifying agents such as linear guars, crosslinked guars, or viscoelastic surfactants (VES), the fluids may be very useful for fracturing operations. While this invention and its claims are not bound by any particular mechanism of operation or theory, the fibers appear to interact with the entrapped gas phase cells which provides several benefits. Fluid viscosity is increased independent of the amount of viscosifying agent. This may lead to improved proppant suspension and transport, or even the lower quantities of viscosifying agent to conduct a particular operation. Also, the fiber and gas interactions appear to significantly increase the stability of the energized fluid, substantially increasing the useful life of the fluid.

Fluids of the invention include an aqueous medium, a gas component, and fibers. The aqueous medium is usually water or brine. The fluids may also include a viscosifying agent that may be, for example, a natural polymer, a synthetic polymer, a viscoelastic surfactant, or any combination thereof. When used as fracturing fluids, embodiments of the invention may further include a proppant.

The gas component of the fluids of the present invention may be produced from any gas that forms an energized fluid when introduced into the aqueous medium. See, for example, the pioneering work by Roland E. Blauer and Clarence J. Durborow in U.S. Pat. No. 3,937,283 ("Formation Fracturing with Stable Foam"). Preferably, the gas component comprises a gas selected from the group consisting of nitrogen, air, carbon dioxide and any mixtures thereof. The gas component assists in the fracturing operation and the well cleanup process. The fluid may contain from about 5% to about 95% volume gas component based upon total fluid volume percent, and preferably from about 25% to about 75% volume gas component based upon total fluid volume percent.

Embodiments of the present invention include fluids containing fibers. Fibers may be hydrophilic or hydrophobic in nature. Hydrophilic fibers are preferred. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like.

The fibrous material preferably has a length of about 1 to about 30 millimeters and a diameter of about 5 to about 100 microns, most preferably a length of about 2 to about 30 millimeters, and a diameter of about 5 to about 100 microns. Fiber cross-sections need not be circular and fibers need not be straight. If fibrillated fibers are used, the diameters of the individual fibrils can be much smaller than the aforementioned fiber diameters.

It has been found that at concentrations of fibers between from about 1 to about 15 grams per liter of the liquid phase of the fluid are effective. Preferably, the concentration of fibers are from about 2 to about 12 grams per liter of liquid, more preferably from about 2 to about 10 grams per liter of liquid. For fluids of the invention which contain a viscoelastic surfactant viscosifying agent, the fiber amount is most preferably from about 2 to about 5 grams per liter of liquid; for fluids including a crosslinked polymeric viscosifying agent, the fiber amount is most preferably from about 2 to about 5 grams per liter of liquid; and fluids including a linear polymeric viscosifying agent, the fiber amount is most preferably from about 5 to about 10 grams per liter of liquid.

Fluids of the present invention may further include a viscosifying agent that may be a polymer that is either crosslinked or linear, a viscoelastic surfactant, clay (Bentonite and attapulgite), or any combination thereof. For hydraulic fracturing or gravel packing, or a combination of the two, aqueous fluids for pads or for forming slurries are generally viscosified. A portion of the polymers also typically ends up as major (or sole) components of the filter cake. On the other hand, certain surfactants, especially viscoelastic surfactants ("VES's") form appropriately sized and shaped micelles that add viscosity to aqueous fluids. Small amounts of polymers may be used to increase the viscosity or for purposes, for example as friction reducers. Breakers may also be used with VES's.

Examples of suitable polymers for use as viscosifying agents in the fluids of the present invention include, but are not necessarily limited to, guar gums, high-molecular weight polysaccharides composed of mannose and galactose sugars, or guar derivatives such as hydropropyl guar (HPG), carboxymethyl guar (CMG), carboxymethylhydropropyl guar (CMHPG). Cellulose derivatives such as hydroxyethylcellulose (HEC) or hydroxypropylcellulose (HPC) and carboxymethylhydroxyethylcellulose (CMHEC) may also be used in either crosslinked form, or without crosslinker in linear form. Xanthan and scleroglucan, two biopolymers, have been shown to be useful as viscosifying agents. Polyacrylamide and polyacrylate polymers and copolymers are used typically for high-temperature applications. Of these viscosifying agents, guar, hydroxypropyl guar and carboxymethlyhydroxyethyl guar are preferred.

In many instances, the polymeric viscosifying agent is crosslinked with a suitable crosslinker. Suitable crosslinkers for the polymeric viscosifying agents can comprise a chemical compound containing an ion such as, but not necessarily limited to, chromium, iron, boron, titanium, and zirconium. The borate ion is preferably used as a crosslinking agent.

A viscoelastic surfactant (VES) may be further included in fluids of the invention as a viscosifying agent. The VES may be selected from the group consisting of cationic, anionic, zwitterionic, amphoteric, nonionic and combinations thereof, such as those cited in U.S. Pat. No. 6,435,277 (Qu et al.) and U.S. Pat. No. 6,703,352 (Dahayanake et al.), each of which are incorporated herein by reference. The surfactants, when used alone or in combination, are capable of forming micelles that form a structure in an aqueous environment that contribute to the increased viscosity of the fluid (also referred to as "viscosifying micelles"). These fluids are normally prepared by mixing in appropriate amounts of VES suitable to achieve the desired viscosity. The viscosity of VES fluids is attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

When a VES is incorporated into fluid embodiments of the present invention, the VES can range from about 0.2% to about 15% by weight of total weight of liquid phase, preferably from about 0.5% to about 15% by weight of total weight of liquid phase, more preferably from about 0.5% to about 15% by weight of total weight of liquid phase. A particularly useful VES is Erucyl bis-(2-Hydroxyethyl) Methyl Ammonium Chloride.

The fluids of the present invention may further comprise one or more members from the group of organic acids, organic acid salts, and inorganic salts. Mixtures of the above members are specifically contemplated as falling within the scope of the invention. This member will typically be present in only a minor amount (e.g. less than about 30% by weight of the liquid phase).

The organic acid is typically a sulfonic acid or a carboxylic acid, and the anionic counter-ion of the organic acid salts are typically sulfonates or carboxylates. Representative of such organic molecules include various aromatic sulfonates and carboxylates such as p-toluene sulfonate, naphthalene sulfonate, chlorobenzoic acid, salicylic acid, phthalic acid and the like, where such counter-ions are water-soluble. Most preferred as salicylate, phthalate, p-toluene sulfonate, hydroxynaphthalene carboxylates, e.g. 5-hydroxy-1-napthoic acid, 6-hydroxy-1-napthoic acid, 7-hydroxy-1-napthoic acid, 1-hydroxy-2-naphthoic acid, preferably 3-hydroxy-2-naphthoic acid, 5-hydroxy-2-naphthoic acid, 7-hydroxy-2-napthoic acid, and 1,3-dihydroxy-2-naphthoic acid and 3,4-dichlorobenzoate.

The inorganic salts that are particularly suitable include, but are not limited to, water-soluble potassium, sodium, and ammonium salts, such as potassium chloride and ammonium chloride. Additionally, calcium chloride, calcium bromide and zinc halide salts may also be used. The inorganic salts may aid in the development of increased viscosity that is characteristic of preferred fluids. Further, the inorganic salt may assist in maintaining the stability of a geologic formation to which the fluid is exposed. Formation stability and in particular clay stability (by inhibiting hydration of the clay) is achieved at a concentration level of a few percent by weight and as such the density of fluid is not significantly altered by the presence of the inorganic salt unless fluid density becomes an important consideration, at which point, heavier inorganic salts may be used.

Friction reducers may also be incorporated as viscosifying agents into fluids of the present invention. Any friction reducer may be used. Also, polymers such as polyacrylamide, polyisobutyl methacrylate, polymethyl methacrylate and polyisobutylene as well as water-soluble friction reducers such as guar gum, polyacrylamide and polyethylene oxide may be used. Commercial drag reducing chemicals such as those sold by Conoco Inc. under the trademark "CDR" as described in U.S. Pat. No. 3,692,676 or drag reducers such as those sold by Chemlink designated under the trademarks "FLO 1003, 1004, 1005 & 1008" have also been found to be effective. These polymeric species added as friction reducers or viscosity index improvers may also act as excellent fluid loss additives reducing or even eliminating the need for conventional fluid loss additives.

Fluids based on the invention may also comprise a breaker. The purpose of this component is to "break" or diminish the viscosity of the fluid so that this fluid is more easily recovered from the fracture during cleanup. With regard to breaking down viscosity, oxidizers, enzymes, or acids may be used. Breakers reduce the polymer's molecular weight by the action of an acid, an oxidizer, an enzyme, or some combination of these on the polymer itself. In the case of borate-crosslinked gels, increasing the pH and therefore increasing the effective concentration of the active crosslinker, the borate anion, reversibly create the borate crosslinks. Lowering the pH can just as easily eliminate the borate/polymer bonds. At a high pH above 8, the borate ion exists and is available to crosslink and cause gelling. At lower pH, the borate is tied up by hydrogen and is not available for crosslinking, thus gellation caused by borate ion is reversible. Citric acid may also be used as a breaker, as described in U.S. published patent application 2002/0004464 (Nelson et al.), published on filed on Jan. 10, 2002, which is incorporated herein by reference.

When used as fracturing fluids, embodiments of the invention may also include proppant particles that are substantially insoluble in the fluids of the formation. Proppant particles carried by the fracturing fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it will typically be from about 20 to about 100 U.S. Standard Mesh in size. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particalization, processing, etc. Further information on nuts and composition thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981, which is incorporated herein by reference.

The concentration of proppant in the fluid can be any concentration known in the art, and will preferably be in the range of from about 0.05 to about 3 kilograms of proppant added per liter of liquid phase. Also, any of the proppant particles can further be coated with a resin to potentially improve the strength, clustering ability, and flow back properties of the proppant.

The aqueous medium of the present invention may be water or brine. In those embodiments of the invention where the aqueous medium is a brine, the brine is water comprising an inorganic salt or organic salt. Preferred inorganic salts include alkali metal halides, more preferably potassium chloride. The carrier brine phase may also comprise an organic salt more preferably sodium or potassium formate. Preferred inorganic divalent salts include calcium halides, more preferably calcium chloride or calcium bromide. Sodium bromide, potassium bromide, or cesium bromide may also be used. The salt is chosen for compatibility reasons i.e. where the reservoir drilling fluid used a particular brine phase and the completion/clean up fluid brine phase is chosen to have the same brine phase.

Fluids of the invention may further contain one or more other additives such as surfactants, breaker aids, alcohols, scale inhibitors, corrosion inhibitors, fluid-loss additives, bactericides, and the like. Also, they may include a co-surfactant to optimize viscosity or to minimize the formation of stable emulsions that contain components of crude oil or a polysaccharide or chemically modified polysaccharide.

Another embodiment of the invention includes the use of an oilfield treatment fluid comprising an aqueous medium, a gas component, viscosifying agent, and fibers for hydraulically fracturing a subterranean formation. Techniques for hydraulically fracturing a subterranean formation will be known to persons of ordinary skill in the art, and will involve pumping the fracturing fluid into the borehole and out into the surrounding formation. The fluid pressure is above the minimum in situ rock stress, thus creating or extending fractures in the formation. See Stimulation Engineering Handbook, John W. Ely, Pennwell Publishing Co., Tulsa, Okla. (1994), U.S. Pat. No. 5,551,516 (Normal et al.), "Oilfield Applications", Encyclopedia of Polymer Science and Engineering, vol. 10, pp. 328-366 (John Wiley & Sons, Inc. New York, N.Y., 1987) and references cited therein, the disclosures of which are incorporated herein by reference thereto.

In most cases, a hydraulic fracturing consists or pumping a proppant-free viscous fluid, or pad, usually water with some fluid additives to generate high viscosity, into a well faster than the fluid can escape into the formation so that the pressure rises and the rock breaks, creating artificial fractures and/or enlarging existing fractures. Then, proppant particles are added to the fluid to form a slurry that is pumped into the fracture to prevent it from closing when the pumping pressure is released. The proppant suspension and transport ability of the treatment base fluid traditionally depends on the type of viscosifying agent added. The use of fiber laden energized fluids in accordance with the present invention diminishes the single dominance of the viscosifying agent on proppant suspension and transport ability.

In the fracturing treatment, fluids of the present invention may be used in the PAD treatment, the proppant stage, or both. The components of the liquid are preferably mixed on the surface. Alternatively, a fiber laden fluid may be prepared on the surface and pumped down tubing while the gas component could be pumped down the annular to mix down hole, or vice versa.

Yet another embodiment of the invention includes the use fluids based on the invention for cleanup. The term "cleanup" or "fracture cleanup" refers to the process of removing the fracture fluid (without the proppant) from the fracture and wellbore after the fracturing process has been completed. Techniques for promoting fracture cleanup traditionally involve reducing the viscosity of the fracture fluid as much as practical so that it will more readily flow back toward the wellbore. While breakers are typically used in cleanup, as energized fluids, the fluids of the invention are inherently effective for use in cleanup operations, with or without a breaker.

In another embodiment, the present invention relates to use of fluids based on the invention for gravel packing a wellbore. As a gravel packing fluid, it preferably comprises gravel or sand and other optional additives such as filter cake clean up reagents such as chelating agents referred to above or acids (e.g. hydrochloric, hydrofluoric, formic, acetic, citric acid) corrosion inhibitors, scale inhibitors, biocides, leak-off control agents, among others. For this application, suitable gravel or sand is typically having a mesh size between 8 and 70 U.S. Standard Sieve Series mesh.

The following examples are presented to illustrate the preparation and properties of fiber laden energized fluids and should not be construed to limit the scope of the invention, unless otherwise expressly indicated in the appended claims. All percentages, concentrations, ratios, parts, etc. are by weight unless otherwise noted or apparent from the context of their use.

EXAMPLES

Viscoelastic Surfactant (VES) Fluid Example

A viscoelastic surfactant (VES) fluid example was prepared in a 1 liter warring blender, by mixing the following ingredients:

| Ingredient | Weight % |
|---|---|
| Propane-1,2-diol | 13.4 |
| Propan-2-ol | 20.4 |
| Water | 5.1 |
| Erucyl bis-(2-Hydroxyethyl) Methyl Ammonium Chloride | 61.1 |

The resultant VES fluid was then used to prepare examples of aqueous viscoelastic fluids as set forth below.

Examples A through L

VES Fluids Containing a Gas Component with and without Fibers

The following examples, A through L, were prepared individually using a Waring blender. Ingredients added by weight percentage were weighed and added to the blender, and thoroughly mixed. Examples A through G contained fibers. Examples H through L did not contain fibers. 30 quality air was then introduced into the fluid to form a gas component by whipping the fluid/air mixture in the Waring blender. The volumes of gas component and fluid were subsequently measured in a graduated cylinder to determine the volume ratio of gas to fluid. Fann 50 viscosity was measured in each example at 170 $s^{-1}$ and 21° C.

| | Examples of VES Fluids Containing Fibers and a Gas Component (% amounts in wt % of total fluid wt %) | | | | | | |
|---|---|---|---|---|---|---|---|
| | Example A | Example B | Example C | Example D | Example E | Example F | Example G |
| Water | 97.4% | 97.3% | 97.1% | 97.0% | 96.75% | 96.5% | 96.0% |
| VES fluid example | 0.1% | 0.2% | 0.4% | 0.5% | 0.75% | 1.0% | 1.5% |
| Ammonium Nitrate | 1.5% | 1.5% | 1.5% | 1.5% | 1.5% | 1.5% | 1.5% |

Examples of VES Fluids Containing Fibers and a Gas Component
(% amounts in wt % of total fluid wt %)

|  | Example A | Example B | Example C | Example D | Example E | Example F | Example G |
|---|---|---|---|---|---|---|---|
| 6.4 mm DACRON ® PET Fiber | 1.0% | 1.0% | 1.0% | 1.0% | 1.0% | 1.0% | 1.0% |
| Fluid Volume | 150 ml | 150 ml | 150 ml | 150 ml | 150 ml | 150 ml | 150 ml |
| Gas Volume | 190 ml | 250 ml | 350 ml | 400 ml | 410 ml | 350 ml | 410 ml |
| Fann 50 Viscosity Measured at 170 s$^{-1}$ and 21° C. | 6 mPa-s | 15 mPa-s | 30 mPa-s | 39 mPa-s | 54 mPa-s | 66 mPa-s | 90 mPa-s |

Examples of VES Fluids Containing a Gas Component
(% amounts in wt % of total fluid wt %)

|  | Example H | Example I | Example J | Example K | Example L |
|---|---|---|---|---|---|
| Water | 98.3% | 98.1% | 97.75% | 97.5% | 97.0% |
| VES fluid example | 0.2% | 0.4% | 0.75% | 1% | 1.5% |
| Ammonium Nitrate Salt | 1.5% | 1.5% | 1.5% | 1.5% | 1.5% |
| Fluid Volume | 150 ml | 150 ml | 150 ml | 150 ml | 150 ml |
| Gas Volume | 190 ml | 250 ml | 410 ml | 350 ml | 410 ml |
| Fann 50 Viscosity Measured at 170 s$^{-1}$ and 21° C. | 5 mPa-s | 15 mPa-s | 35 mPa-s | 50 mPa-s | 75 mPa-s |

FIG. 1 illustrates an advantage of adding fibers to VES fluids containing a gas component. In FIG. 1 Fann 50 viscosity measurements were plotted versus viscoelastic surfactant concentration for each of Examples A through L. Examples A through G were grouped together to represent fluids containing fibers (closed diamonds-solid line), and Examples H through L were grouped together as fluids without fibers (open triangles-dashed line). The group containing fibers showed a significant viscosity increase across the surfactant concentration range as compared with the group without fibers. This indicates that addition of fibers can provide such benefits as a reduction in viscosifying agent concentration, VES in this case, to achieve similar viscosity, or even an increase in viscosity at like surfactant concentrations. As a result of these improved viscosity properties, energized fluids with significant gas phase stability, excellent proppant transport and suspension capability are possible without major dependence upon viscosifying agent to provide such attributes.

Examples M and N

Proppant Containing VES Fluids

A benefit of adding fibers to viscoelastic fluids containing a gas component and proppant is significant extension of proppant settling time. To illustrate this benefit, the Examples M and N were prepared and evaluated.

In a Waring blender, 1% by weight of the viscoelastic surfactant fluid example above was mixed with 1.5% by weight ammonium nitrate and 97.5% by weight water. 30 quality air was then introduced into the fluid to form a gas component by whipping the fluid/air mixture in the Waring blender. The resultant fluid had a measured viscosity of 51 mPa-s at 170 s$^{-1}$ and 21° C. Sand, as a proppant, was added to the gas containing fluid in the amount of 0.24 kg per liter of fluid, thus generating Example M. The foam half-life (to test gas phase stability) and proppant settling time were evaluated. The foam half-life was determined by the tests as set forth in U.S. Pat. No. 4,108,782, columns 5 and 6, under the headings "Initial Foam Volume Test" and "Foam Half-Life Test," the disclosure of which is incorporated herein by reference. The foam half life had a value of 2 hours, and proppant settling time was less than 5 minutes.

Example N was prepared in the same manner as Example M above. However, a further addition of 6.4 mm DACRON® Polyester PET Fiber in an amount of 1% by weight of total liquid weight was made, before the mixture was whipped. As in Example M, 30 quality air was then introduced into the fluid to form a gas component by whipping the fluid/air mixture in the Waring blender. The resultant fluid had a measured viscosity of 69 mPa-s at 170 s$^{-1}$ and 21° C. Sand, as a proppant, was added to the gas containing fluid in the amount of 0.24 kg per liter of fluid, thus generating Example N. Significantly different than for Example M, the foam half-life of Example N was increased to over eight hours, and the suspension of sand proppant in the gas and fiber containing fluid did not settle.

Examples O, P, and Q

Crosslinked Guar Fluids

To illustrate the effectiveness of adding fibers to increase the viscosity of traditional guar based fluids containing a gas component the following examples, O, P, and Q were prepared and evaluated for viscosity properties. A gas containing crosslinked guar fluid was prepared as follows:

| Ingredient | Parts by Volume |
|---|---|
| The following two ingredients were added to a Waring blender and allowed to mix for 30 minutes: | |
| Water | 200 ml |
| 1:1 weight mixture of Guar Gum with #2 Diesel Oil | 0.8 ml |
| The following four ingredients were added slowly with mixing: | |
| 1:1 weight mixture of Tetramethyl Ammonium Chloride with Water | 0.4 ml |
| Non-emulsifying Surfactant | 0.2 ml |
| Nonionic Surfactant | 0.4 ml |
| d-Sorbitol | 0.4 ml |
| The following ingredient was then added: | |
| 90% Borate acid aqueous solution | 1.0 ml |

Upon addition of the borate crosslinker solution, the Waring Blender rpm's were increased to whip air into the mixture to generate a gas containing crosslinked guar fluid. The total fluid and gas volume of was 250 ml.

A first volume of gas containing crosslinked guar fluid was prepared as set forth immediately above to form Example O, which did not contain fibers. Example O was placed into a 250 ml graduated glass cylinder with a 4 cm diameter. To evaluate the viscosity of the fluid, a 1.25 cm diameter marble with a mass of 5.2 grams was set in the fluid and allowed to fall freely therein. For Example O, the marble quickly fell the height of the fluid column, about 25 cm, over a 28 second time period.

A second volume of gas containing crosslinked guar fluid, prepared as set forth above, had a fiber component of 6.4 mm DACRON® Polyester PET Fiber added in an amount of 0.6% by weight of total liquid weight to prepare Example P. Viscosity was evaluated in the same manner as Example O, using the identical marble and a graduated glass cylinder. The marble slowly fell through the height of the fluid column over 1680 seconds.

A third volume of gas containing crosslinked guar fluid, prepared as set forth above, had a fiber component of 6.4 mm DACRON® Polyester PET Fiber added in an amount of 1% by weight of total liquid weight to prepare Example Q. Viscosity was evaluated in the same manner as immediately above. After one hour, the marble had not fallen any measurable distance.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of treating a subterranean formation, comprising:
    a. preparing a fluid comprising an aqueous medium and a viscosifying agent;
    b. adding a gas component to the fluid to form a foam;
    c. adding a foam stabilizing amount of a fiber to the fluid; and
    d. injecting the mixture of the fluid, gas component and fiber into a subterranean formation,
    wherein a foam formed from the mixture of fluid, fibers and gas component has a foam half-life value greater than 2 hours, and
    wherein the fiber is selected from the group consisting of natural organic fibers, comminuted plant materials, novoloids, novoloid-type polymers, polyaramides, glasses, ceramics, metals, carbon, and any mixture thereof.

2. The method of claim 1, wherein the fluid further comprises a member selected from the group consisting of organic acids, organic acid salts, inorganic salts, and combinations of one or more organic acids or organic acid salts with one or more inorganic salts.

3. The method of claim 1, wherein the fluid further comprises a friction reducer.

4. The method of claim 1, wherein the gas component comprises a gas selected from the group consisting of nitrogen, air, carbon dioxide and any mixtures thereof.

5. The method of claim 1, wherein the gas component comprises from about 5% to about 95% of total fluid volume percent.

6. The method of claim 1, wherein the fiber is incorporated in an amount from about 1 to about 15 grams per liter of total liquid phase.

7. The method of claim 1, wherein the mixture further comprises a proppant.

* * * * *